Jan. 18, 1938.   K. C. KNAPP   2,105,602
PIPE LINE RECLAIMER
Filed March 31, 1937   2 Sheets-Sheet 1
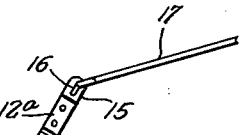
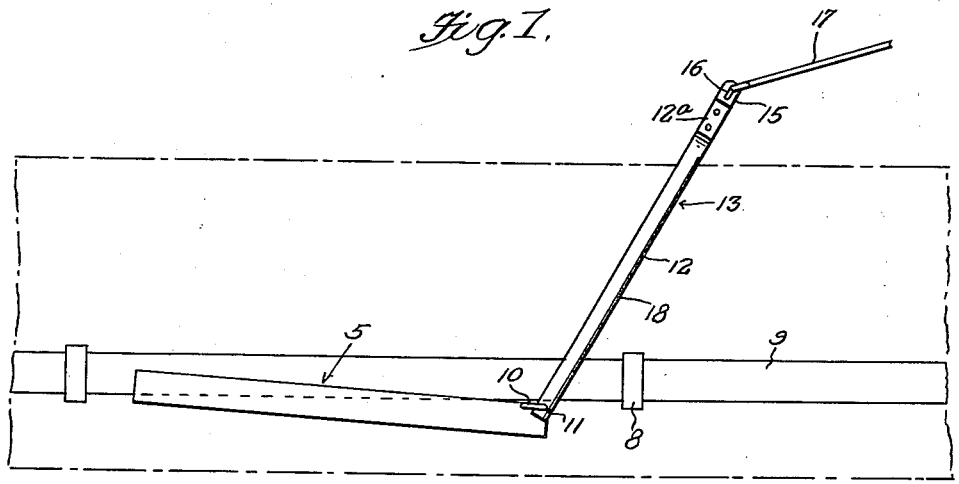
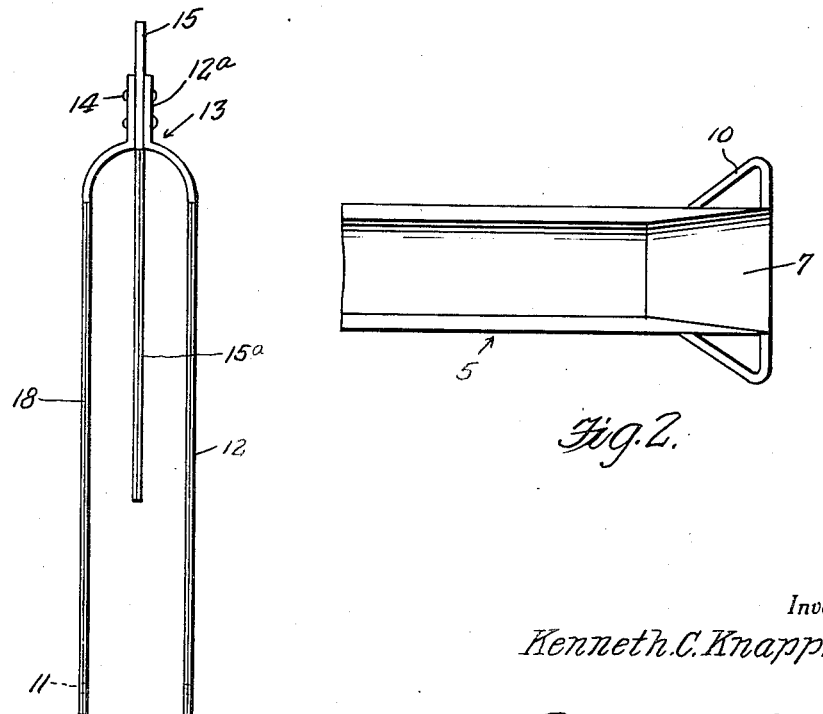
Inventor
Kenneth C. Knapp.
By Clarence A. O'Brien
Hyman Berman
Attorneys

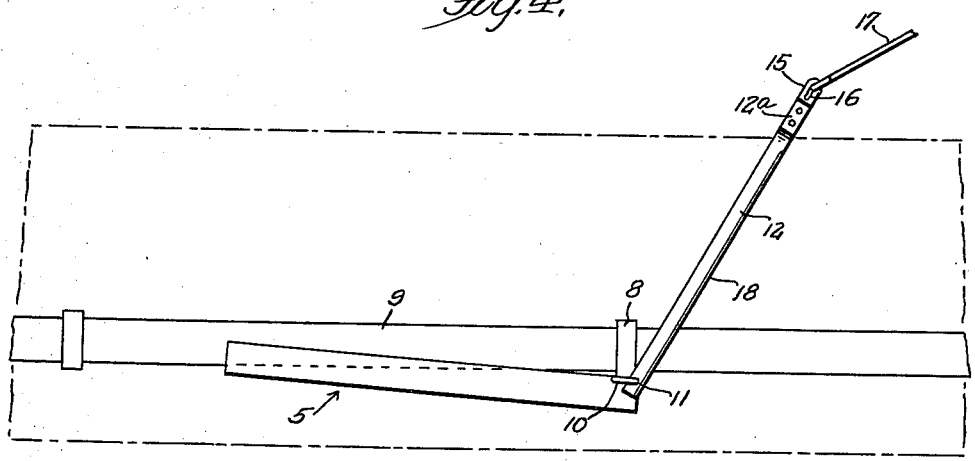
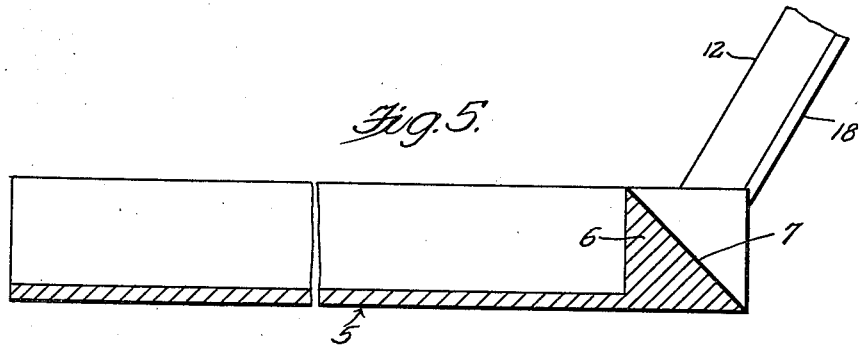
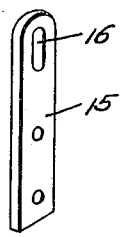

Patented Jan. 18, 1938

2,105,602

UNITED STATES PATENT OFFICE 2,105,602

PIPE-LINE RECLAIMER

Kenneth C. Knapp, Galva, Kans., assignor of one-fourth to O. L. Sherrill, Canton, Kans., and one-tenth to S. R. Knapp, McPherson, Kans.

Application March 31, 1937, Serial No. 134,146

3 Claims. (Cl. 37—193)

This is a device for reclaiming or raising to the surface buried pipe lines and an object of the invention is to provide a device of this character which will facilitate cutting the buried pipe line loose and raising the pipe line from the bottom of the ditch to the ground level.

The invention together with its objects and advantages will be best understood from a study of the following description taken in connection with the accompanying drawings wherein:—

Figure 1 is a side elevational view of the device and illustrating an application of the same.

Figure 2 is a top plan view of a pipe engaging member.

Figure 3 is an elevational view of a yoke.

Figure 4 is a view similar to Figure 1 further illustrating the invention.

Figure 5 is a longitudinal sectional view through the pipe engaging member.

Figure 6 is a transverse sectional view through one of the legs of the yoke and

Figure 7 is a perspective view of the shank of the yoke.

Referring to the drawings by reference numerals it will be seen that in the preferred embodiment thereof the device comprises a pipe engaging member 5 which is in the nature of a substantially semi-cylindrical elongated member which may be formed by cutting a length of pipe or tubing longitudinally in half. At one end thereof the member 5 is open, while at its relatively opposite end the member 5 is provided with a solid portion 6 and at the solid end thereof is bevelled as at 7 so as to ride over shoulders, collars or analogous projections 8 of the pipe line 9.

At the end 6 thereof the member 5 is provided on opposite sides thereof with eyes or loops 10 which are engaged in apertures 11 provided in the free ends of the legs or sides 12 of a yoke or fork 13.

The yoke or fork 13 comprises the aforementioned legs 12 which at one end are curved inwardly toward one another and terminate in parallel extensions 12a riveted or otherwise secured as at 14 to one end of a bar 15 which is in the form of a suitable length of metal one end of which is disposed between the extensions 12a of legs 12, and the other end of which extends between the legs of the yoke.

At the free end thereof shank 15 is provided with a slot 16 with which is engaged the eye or loop on one end of a pull rod, cable or the like 17 that has its other end, in the event, for example, the element 17 is in the form of a cable, windable on a suitable winch for exerting a pull on the member 5 in a manner to cause the latter to move longitudinally of the pipe line 9 incidental to the freeing and raising of the line.

At the forward or leading edges thereof the legs 12 of yoke 13 and the bar 15 are sharpened to knife like edges 18, 15a, respectively, so that, as will be apparent from a study of Figures 1 and 4, as the device is pulled through the ditch edges 18, 15a will serve to loosen the dirt above and at opposite side of the pipe line 9 as the member 5 serves to work its way between the line 9 and the bottom of the ditch for further freeing the pipe line.

Also, as will be clear from a study of Figures 1 and 4 bevelled surface 7 at the end 6 of the pipe line will ride over collars, projections or the like 8 disposed at intervals, generally at the joints between the several sections of the pipe line so that such projections will not impede the progress of the device 5.

It is thought that from the foregoing it will be readily appreciated that a device of this character will serve admirably for loosening the dirt about a pipe line and for raising the pipe line in a manner to facilitate removal of the line from its ditch.

Having thus described the invention, what is claimed as new is:—

1. A device of the character and for the purpose specified comprising an elongated semi-cylindrical pipe engaging shoe solid at one end and open at its respective opposite end, said shoe at the solid end thereof having a bevelled surface, and also provided at said end with laterally extending eyes projecting from opposite sides thereof, and a yoke member having legs straddling the last named end of said shoe and provided at one end with apertures with which said eyes are engaged for loosely connecting the legs of said yoke with said shoe.

2. A device of the character and for the purpose specified comprising an elongated semi-cylindrical pipe engaging shoe solid at one end and open at its respective opposite end, said shoe at the solid end thereof having a bevelled surface, and also provided at said end with laterally extending eyes projecting from opposite sides thereof, a yoke member having legs straddling the last named end of said shoe and provided at one end with apertures with which said eyes are engaged for loosely connecting the legs of said yoke with said shoe, and said yoke also including a shank provided with a slot and a pull cable secured at one end to the slotted end of said shank.

3. A device of the character and for the purpose specified comprising an elongated semi-cylindrical pipe engaging shoe solid at one end and open at its respective opposite end, said shoe at the solid end thereof having a bevelled surface, and also provided at said end with laterally extending eyes projecting from opposite sides thereof, a yoke member having legs straddling the last named end of said shoe and provided at one end with apertures with which said eyes are engaged for loosely connecting the legs of said yoke with said shoe, and said yoke also including a shank provided with a slot and a pull cable secured at one end to the slotted end of said shank, and the legs of said yoke having one longitudinal edge thereof sharpened to a knife edge.

KENNETH C. KNAPP.